United States Patent [19]

Mercer et al.

[11] Patent Number: 4,743,486

[45] Date of Patent: May 10, 1988

[54] PRODUCT AND METHOD OF PRODUCING A PLASTICS MATERIAL MESH STRUCTURE

[75] Inventors: Frank B. Mercer, Blackburn; Keith F. Martin, Wiswell, both of Great Britain

[73] Assignee: P.L.G. Research Limited, Blackburn, England

[21] Appl. No.: 851,737

[22] Filed: Apr. 14, 1986

[30] Foreign Application Priority Data

Apr. 12, 1985 [GB] United Kingdom ............... 8509498

[51] Int. Cl.[4] .................... B32B 3/10; B29C 55/00
[52] U.S. Cl. .................... 428/134; 264/288.8; 264/DIG. 81; 428/131; 428/136; 428/910
[58] Field of Search .................... 264/288.8, DIG. 47, 264/DIG. 81; 428/134, 156, 255, 910, 135, 136, 131

[56] References Cited

U.S. PATENT DOCUMENTS

| | | | |
|---|---|---|---|
| 3,253,072 | 5/1966 | Scragg et al. | 264/147 |
| 3,386,876 | 6/1968 | Wyckoff | 264/288.8 |
| 3,616,154 | 10/1971 | Dow | 264/154 |
| 3,642,967 | 2/1972 | Doll | 264/51 |
| 4,303,714 | 12/1981 | Mercer | 264/288.8 |
| 4,374,798 | 2/1983 | Mercer | 264/DIG. 81 |
| 4,394,342 | 7/1983 | Mercer | 428/910 |

FOREIGN PATENT DOCUMENTS

| | | |
|---|---|---|
| 982036 | 2/1965 | United Kingdom . |
| 1055963 | 1/1967 | United Kingdom . |
| 1116181 | 6/1968 | United Kingdom . |
| 2096531 | 10/1982 | United Kingdom . |
| 2124965 | 2/1984 | United Kingdom . |

Primary Examiner—James Lowe
Attorney, Agent, or Firm—Holman & Stern

[57] ABSTRACT

Waisted holes are used when stretching a perforated starting material to form a mesh structure having molecularly-orientated strands. The holes define strand-forming zones which have a center part of greater width than end parts; orientation is initiated in the end parts and travels towards the middle until the whole of the strand-forming zone has been stretched out to form a molecularly-oriented strand. In the molecularly-orientated strand, there are three portions in which the middle of the strand has moved away from the ends of the strand during stretching the same distance as the edges of the strand, these portions corresponding to the end and center parts; in between, the middle of the strand has moved away from the respective end during stretching a different distance to the edges of the strand.

11 Claims, 3 Drawing Sheets

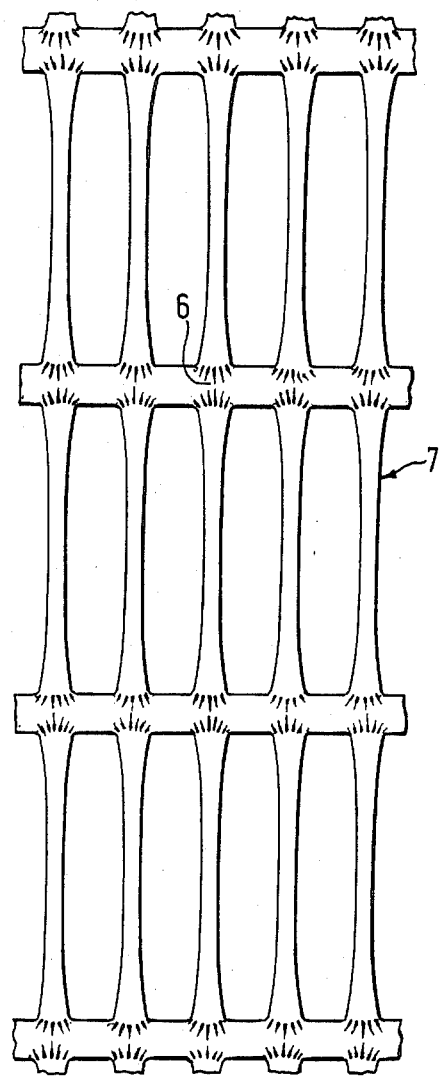
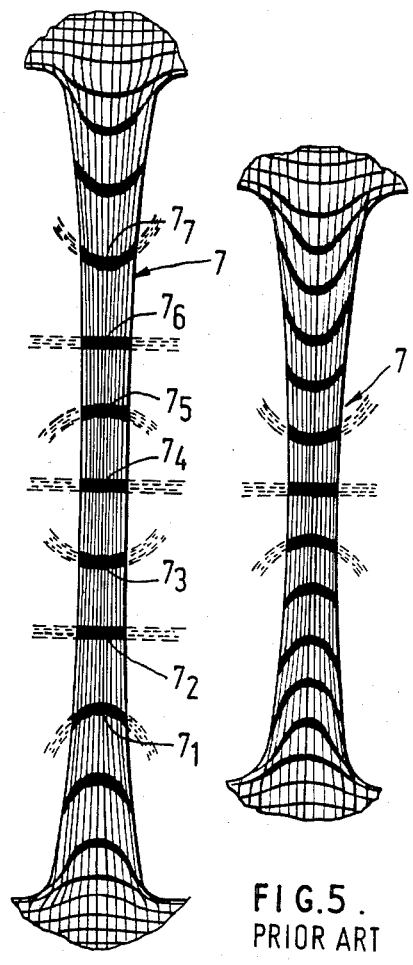
FIG.3.
FIG.4.
FIG.5.
PRIOR ART

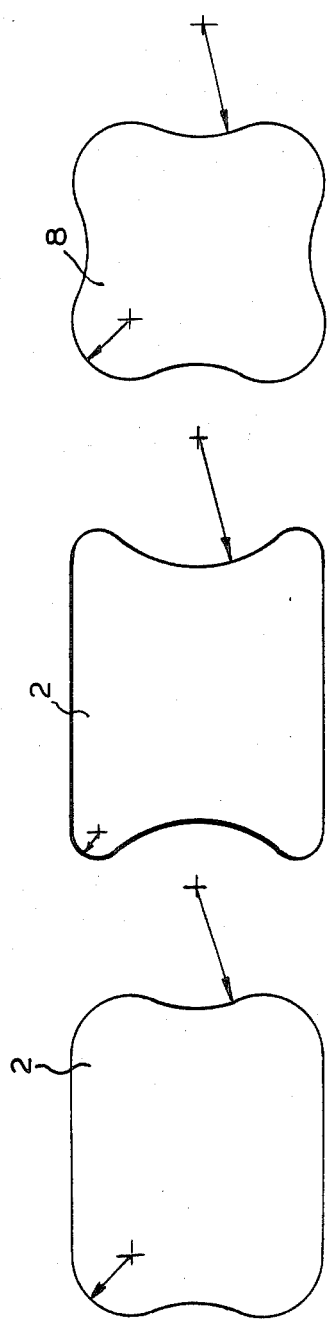
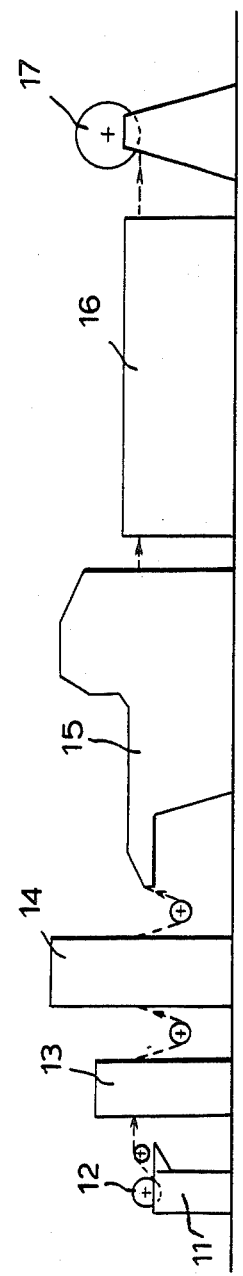

PRODUCT AND METHOD OF PRODUCING A PLASTICS MATERIAL MESH STRUCTURE

BACKGROUND OF THE INVENTION

The present invention relates to a method of producing a plastics material mesh structure, comprising providing a starting material which has a pattern of holes or depressions, and stretching the starting material in at least one stretching direction to stretch out and molecularly orientate strand-forming zones of the starting material to form molecularly-oriented strands. Such a method is described in for instance GB No. 2 035 191B, GB No. 2 073 090B, GB No. 2 096 531A, GB No. 2 108 896A and GB No. 2 124 965A. The invention is applicable to such patent specifications. The definitions given in the GB specifications recited above are applicable as appropriate to the present description.

In GB No. 2 073 090B, it was found that the transmission of stress through the starting material during the initial stretching stage could be irregular, giving rise to irregular yielding of the structure; the result of such irregular yielding can be a structure in which the bars are not perfectly aligned transversely. In GB No. 2 035 191B, when carrying out the second stretch in the transverse direction on a stenter, the transverse strands may not all be stretched equally or at equal rates, causing lack of alignment of the machine direction strands or imperfect junction zones. More generally, it is desirable to increase the speed of stretching, to increase the stretch ratio applied, and to obtain better control of the stretching operation and more particularly of the position of the zone at which the structure will break if excess loads are applied in use.

THE INVENTION

In accordance with the invention, the strand-forming zones have, as considered in the stretching direction, a first part followed by a second part followed by a third part, the first and third parts being of less width than the second part, the respective widths being as measured in the direction at right angles to the stretching direction, and the strand-forming zones yielding initially at the first and third parts and the second parts subsequently being stretched out and molecularly orientated. A product of the invention has strands which have been molecularly oriented from end to end and comprising seven portions as considered going from one end of the strand to the other, namely first and seventh portions in which the middle of the strand has moved during stretching further away from the respective end of the strand than the edges of the strand, second, fourth and sixth portions in which the middle of the strand has moved during stretching the same distance from the ends of the strand as the edges of the strand, and third and fifth portions in which the middle of the strand has moved during stretching less from the respective end of the strand than the edges of the strand.

The holes or depressions will have bulges or lobes defining the sides of the first and third parts. In general, the bulges or lobes could be just on one side of the strand forming zones, or one bulge could be on one side and the other bulge on the other side. However, it is preferred that the strand-forming zones should be substantially symmetrical about an axis parallel to said stretching direction. In addition, though it would be possible to have another part of greater width followed by a further part of less width, the preferred shape has just the two narrower parts, the second part being preferably in the middle of the strand-forming zones, as considered in the stretching direction. Furthermore, the widths of the first and third parts are preferably substantially equal. Preferably, the strand-forming zones are substantially symmetrical about an axis at right angles to said stretching direction.

The strand-forming zones are compelled to yield at the first and third parts, i.e. the invention determines which parts stretch first (and in which parts the stretching is delayed). As stretching begins and the material starts to yield, orientation will progress from each yield part predominantly towards the centre of the strand-forming zone, i.e. towards the middle of the strand (which is the opposite to that occurring in GB No. 2 073 090B); in addition, progression in the opposite direction, towards the bar or junction, is delayed. This enables the level of orientation at the middle of the strand to be controlled. By exercising such control, the tensile failure position of the structure when in use can be predetermined and maintained well away from the transverse bars. Failure at the bars causes difficulty in predicting the long term strength, whilst a failure in the orientated strand enables the long term strength of the structure to be more accurately predicted. Due to the better control, higher stretch ratios can be safely applied. The invention has an added advantage of enabling higher production speeds to be achieved (compared to a material of GB No. 2 073 090B with circular holes).

In addition, it is found that the level of orientation penetrating the bar (i.e. beyond the tangent line) is reduced for the same stretch ratio and the same strand-forming zone (minimum) width, compared with GB No. 2 073 090B, or conversely higher stretch ratios or wider strand-forming zones can be used with the same penetration, producing a lighter or stronger product.

If the structure is to be stretched in two different directions, strand-forming zone may be shaped such that said one stretching direction is either the first or the second direction of stretch. Another possibility is to shape the strand-forming zones such that the sequence of widths occurs in each of the two stretching directions. If the biaxial stretching of GB No. 2 035 191B is being carried out using the same stretch ratios, considering the strand-forming zones in relation to the first stretch direction, the penetration of the bar is less and the uniaxially-stretched product is easier to stretch in the direction at 90° as a result of the lower molecular alignment through the bar; i.e., the zones between the future junctions orientate first and the junctions themselves are protected. This effect can be further enhanced by arranging the strand-forming zones in relation to both stretching directions, so that in the second stretch, there are again two parts at which the strand-forming zones will yield. It is expected that increased manufacturing speeds can be achieved due to the better control, and thus improve manufacturing economics.

The invention is particularly useful when the starting material is high density polyethylene (HDPE) though it is also applicable to other plastics materials (such as polypropylene (PP)) which can be used to form molecularly-orientated strands.

It is highly desirable that the peripheries of the respective holes or depressions have no sharp angles, i.e. be defined by curves or straight lines with smooth transitions from one curve or straight line to another. At least the sides of the first and third parts should not have any angles or sharp changes in direction, the transitions from one curve or straight line to another being curved or radiused. If the radiussing of the curves at the first and third parts (or even at the second part) is too small, high stresses can be generated in the first and third parts and cause rupture of the first and third parts during the stretching. The radiuses should be large enough to avoid any objectionable notching effect, to avoid highly stressed zones where the orientated strand enters the bar or junction and lessening the penetration of the orientation into the bar or junction. In general radiuses of less than 1 mm or even 2 mm should be avoided, though smaller radiuses may be used if the holes themselves are very small. The notching effect may not be so significant on the sides defining the second part or at those ends of the holes or depressions which face in said stretching direction, though it is still desirable to avoid sharp angles here. If the difference in width between the second part (width $x_2$) and the first and third parts (width $x_1$) is too great, the strength in the first and third parts is insufficient to orientate the wider second part, generating high stresses in the first and third parts and causing rupture of the first and third parts during the stretching - this results in a limitation of the stretch ratio that can be safely applied during manufacture. The correct width difference and radiussing can be ascertained by trial-and-error, but in a general sense, $x_2$ should be as close to $x_1$ as possible, whilst ensuring that the first and third parts yield first; the most favourable conditions occur when the width reduction of the first and third parts is just sufficient to initiate yield at those parts, though $x_2$ must be greater than $x_1$. There is a discussion below of some width differentials and radiuses which work and which do not work, but these are not limiting as they may vary significantly from one polymer to another. It is preferred that, for HDPE and PP at least, the $x_2:x_1$ ratio should not be less than 1.016:1 and it is preferred that the $x_2:x_1$ ratio should not be greater than 1.2:1. The limits for HDPE and PP are very similar, though at the upper limit of the $x_2:x_1$ ratio, PP does not necessarily break but leaves lumps in the centre of the strand. The radius of the second part can be determined by the hole length, width difference and radiussing of the first and second parts.

THE DRAWINGS

The invention will be further described, by way of example, with reference to the accompanying drawings, in which:

FIG. 3 shows the material of FIG. 1, after stretching N-S (i.e. up and down the sheet of drawings);

FIGS. 4 and 5 show, for comparison purposes, the material of FIG. 3 and a prior art material, after stretching;

Figure 2:
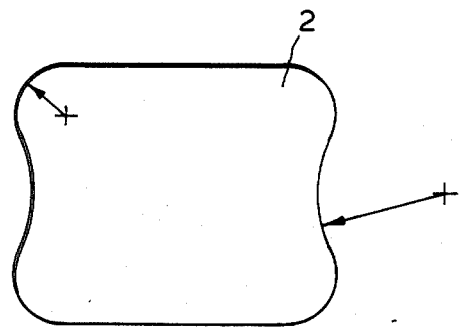
FIG. 2 shows one of the holes in the material of FIG. 1, on a larger scale.

FIG. 6 corresponds to FIG. 2, but shows a less suitable hole shape;

FIG. 7 corresponds to FIG. 2, but shows a less suitable hole shape;

FIG. 8 shows a suitable hole shape for biaxial stretching; and

FIG. 9 is a schematic elevation of a production machine.

In FIG. 3, the lines which indicate the profile of the structure extend up and down the slope, following the line of maximum gradient, i.e. at right angles to conventional contour lines.

FIGS. 1 TO 5

The starting material 1 is substantially uniplanar, having flat, parallel faces, and forms a uniplanar product. The starting material 1 has a regular, square pattern of holes 2 (i.e. with their centres on a notional square or rectangular grid), generally in accordance with GB No. 2 073 090B, which can be referred to for further explanation. The holes 2 were formed by punching. If alternatively the starting material had depressions formed in it by say embossing, the resulting mesh structures may have mesh openings containing film or such film may rupture during the stretching. The peripheries of the holes 2 are defined by circular arcs and straight lines with no abrupt transitions or sharp angles. Strand forming zones 3 are defined between the holes. The centres of the curves are indicated in FIG. 2. Each strand-forming zone 3 has, considered in the stretching direction (N-S), a first part $x_1$ followed by a second part $x_2$ followed in turn by a third part $x_1$, the first and third parts $x_1$ being of equal width and of less width than the second part $x_2$. Each hole 2 and each strand-forming zone 3 (except at the selvedges) is symmetrical about the stretching direction axis (N-S) and about the axis at right angles thereto. Example 5 below is a specific example relating to these Figures. The radiussing of the first and third (narrower) parts was 3 mm in Example 5.

On stretching, it was observed that the initial yield occurred in the parts $x_1$. The penetration into the bars 6 is lessened, though in Example 5, orientation did to some degree pass right across the bars 6.

The product was illustrated in FIG. 3, of interest was that the mid-points of the strands 7 were roughly 20% to 30% thicker than the quarter and three quarter points, indicating that much more stretch could have been applied.

The samples of FIGS. 4 and 5 were stretched from a starting material printed with a grid of equi-spaced "truth lines". FIG. 4 was the product of Example 7 below. The samples were stretched until each had the same level of penetration of orientation into the bar, the respective stretch ratios (on the strand) being 9.6 and 7.7. In stretching, the pitch of the transverse truth lines increases; also the transverse truth lines bow according to whether the middle strip of the strand is moving more than the sides; the bows are extended with dashed lines. FIG. 4 corresponds to FIG. 3; FIG. 5 is a product of GB No. 2 073 090B though the hole length was less (N-S) in the starting material than for FIG. 4. FIG. 4 shows the transverse truth lines straight in three parts, corresponding to the three parts in the strand-forming zone 3. FIG. 5 shows the transverse truth lines straight only in the centre, corresponding to the initial yield part. Along the length of the orientated strand, seven differing portions can be identified, namely: first and seventh portions $7_1$, $7_7$ in which the middle of the strand has moved during stretching further away from the respective ends of the strand than the edges of the strand (truth lines bowed towards the mid-point), second, fourth and sixth portions $7_2$, $7_4$, $7_6$ in which the middle of the strand has moved during stretching the same distance from the ends of the strand as the edges of the strand (truth lines straight), and third and fifth portions in which the middle of the strand has moved during stretching less from the respective end of the strand than the edges of the strand (truth lines bowed away from the mid-point). The initial yield parts can be identified between truth lines which bow towards each other, which is also the case for the single yield part in FIG. 5. The existence of the differential movement can often be detected in the product by shrink-back testing.

The product is useful for soil reinforcement. In addition, the very consistent width makes the product particularly useful for making gabions when connecting strands using the arrangement described in GB No. 2 078 833A and B.

FIGS. 6 AND 7

The radiussing of the first and third (wider) parts 3.5 is 3 mm in FIG. 6 and 2.38 mm in FIG. 7. FIG. 7 shows a punch that worked with data otherwise as given in Example 2 below, but produced a slightly inferior product. It is desirable to use the punch of FIG. 6 with wider strand-forming zones than in Example 2.

FIG. 8

FIG. 8 illustrates the shape of a hole 8 which is suitable for a square pattern for producing the biaxially-stretched products, as described in GB No. 2 035 191B.

The peripheries of the holes 8 are completely defined by circular arcs with no abrupt transitions or sharp angles.

FIG. 9

A let-off unit 11 supports a roll 12 of unperforated starting material which passes through the plant along the path indicated by the dashed lines and arrows. The starting material passes through a sheet flattening unit 13, a perforator 14, a machine direction orientation machine 15 and a transverse direction orientation machine 16, and is wound up on a wind-up unit 17. The units of the plant are conventional units. In the machine 15, the starting material is stretched uniaxially to form a mesh structure like that of FIG. 3; in the machine 16, the second stretch is applied to form a biaxial mesh structure (not illustrated but generally as one of FIGS. 5 to 9, 21 and 22 of U.S. Pat. No. 4,374,798). In the machine 15, the transverse restraint is natural, due to the distance between the rolls, but not 100%. In the machine 16, there is natural. 100% machine direction restraint.

EXAMPLES

Figure 1:
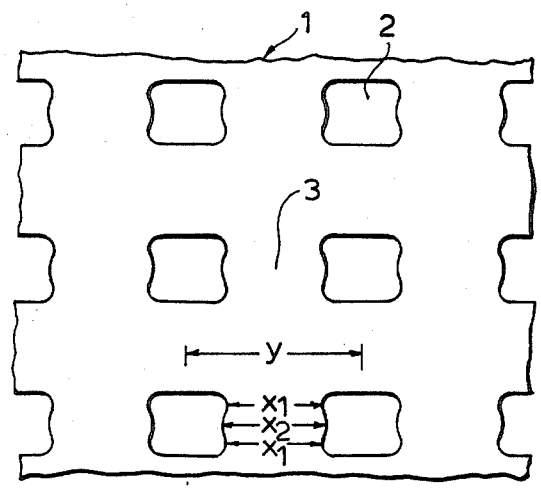
FIG. 1 shows a "square" pattern starting material.

These were based on laboratory specimens in the case of Examples 2 to 9. Example 1 is theoretical. Example 8 is the same as Example 7, but expressed in metric units. The procedure was as in FIGS. 1 to 3. The sheet was 4.5 mm thick. Stretching was performed at 105° C. for HDPE and 120° C. for PP. There was no significant lateral restraint but very little transverse shrinkage occurred.

The details are set out in the Table below. As the measurements were mostly made in inches ("), they are given as such. "Performs as expected" means that yield was initiated in the first and third parts and progressed towards the second part until all the strand-forming zone had orientated to form a fairly uniform thickness strand (thickness at mid-point not more than 30% of minimum thickness). The radiussing at the corners of the holes varies. This did not substantially alter the progression of the orientation towards the centre of the strand-forming zone—only when the centre was orientated did the orientation move noticeably into the bar. The transverse pitch also varies—this only matters if the strand-forming zones are so wide that the waisting of the hole must be very deep to obtain the desired $x_2:x_1$ ratio.

TABLE

| | Punch Shape | | N-S Pitch | y (transverse pitch) | Strand forming zone width | | stretch $X_2:X_1$ | Strand ratio | Material | Comments |
|---|---|---|---|---|---|---|---|---|---|---|
| | | | | | min | max | | | | |
| 1 | Length (N-S) | ⅝" | 1¼" | 1" | 0.625" | 0.75" | 1.200:1 | 9.6:1 | HDPE | Performs as expected, but left a thicker centre to the strand and bar penetration higher |
| | Max. width | ⅜" | | | | | | | | |
| | Corner radius | ⅛" | | | | | | | | |
| | Waist radius | 0.183" | | | | | | | | |
| | Width difference | 0.125" | | | | | | | | |
| 2 | Length (N-S) | ⅞" | 1⅛" | 1⅛" | 0.5" | 0.567" | 1.134:1 | 10.0:1 | HDPE | Performs as expected. |
| | Max. width | ⅝" | | | | | | | | |
| | Corner radius | 3/32" | | | | | | | | |
| | Waist radius ¼" | | | | | | | | | |
| | Width difference | 0.067" | | | | | | | | |
| 3 | Length (N-S) | ⅝" | 1¼" | 1" | 0.625" | 0.645" | 1.032:1 | 10.2:1 | PP | Performs as expected. |
| | Max. width | ⅜" | | | | | | | | |
| | Corner radius | ⅛" | | | | | | | | |
| | Waist radius | 1.637" | | | | | | | | |
| | Width difference | 0.020" | | | | | | | | |
| 4 | Length (N-S) | ⅞" | 1⅛" | 1⅛" | 0.5" | 0.541" | 1.080:1 | 10.0:1 | HDPE | Performed as expect. |
| | Max. width | ⅝ | | | | | | | | |
| | Corner radius | ⅛" | | | | | | | | |
| | Waist radius | ¼" | | | | | | | | |
| | Width difference | 0.040" | | | | | | | | |
| 5 | Length (N-S) | 12.7 mm | 28.6 mm | 28.6 mm | 12.7 | 13.6 | 1.070:1 | 9.6:1 | HDPE | Performs as expected. |
| | Max. width | 15.9 mm | | | | | | | | |
| | Corner radius | 3 mm | | | | | | | | |
| | Waist radius | 6 mm | | | | | | | | |
| | Width difference | 0.9 mm | | | | | | | | |
| 6 | Length (N-S) | ⅝" | 1¼" | 1" | 0.625" | 0.665" | 1.060:1 | 9.6:1 | HDPE | Performs as expected. |
| | Max. width | ⅜" | | | | | | | | |
| | Corner radius | ⅛" | | | | | | | | |
| | Waist radius | 9/16" | | | | | | | | |
| | Width difference | 0.040" | | | | | | | | |
| 7 | Length (N-S) | ⅝" | 1¼" | 1" | 0.625" | 0.645" | 1.030:1 | 9.6:1 | HDPE | Performs as expected. Preferred punch shape. |
| | Max. width | ⅜" | | | | | | | | |
| | Corner radius | ⅛" | | | | | | | | |

TABLE-continued

| | Punch Shape | | N-S Pitch | y (transverse pitch) | Strand forming zone width min | Strand forming zone width max | stretch X₂:X₁ | Strand ratio | Material | Comments |
|---|---|---|---|---|---|---|---|---|---|---|
| 8 | Waist radius | 1.637" | | | | | | | | |
| | Width difference | 0.020" | | | | | | | | |
| | Length (N-S) | 15.9 mm | 31.75 cm | 25.4 mm | 15.9 | 15.4 | 1.030:1 | 9.6:1 | HDPE | Performs as expected. Preferred punch shape. |
| | Max. width | 9.5 mm | | | | | | | | |
| | Corner radius | 3.2 mm | | | | | | | | |
| | Waist radius | 41.6 mm | | | | | | | | |
| | Width difference | 0.5 mm | | | | | | | | |
| 9 | Length (N-S) | 5/8" | 1¼" | 1" | 0.625" | 0.635" | 0.016:1 | 9.6:1 | HDPE | Performs as expected. |
| | Max. width | 3/8" | | | | | | | | |
| | Corner radius | 1/8" | | | | | | | | |
| | Waist radius | 3.393" | | | | | | | | |
| | Width difference | 0.010" | | | | | | | | |

In general, the features described in GB No. 2 096 531A, page 8, lines 2, 3, 10–16 and 32–53 may be applied to the present invention, whether or not the holes or depressions are arranged as in GB No. 2 096 531A.

The present invention has been described above purely by way of example, and modifications can be made within the scope of the invention.

We claim:

1. A method of producing a plastics material mesh structure, comprising providing a starting material which has a pattern of holes or depressions whose centers are on a notional square or rectangular grid and wherein respective said holes or depressions have peripheries defined by curves or straight lines with smooth transitions from one curve or straight line to another, which pattern defines strand-forming zones between holes or depressions which are adjacent in a direction at right angles to a stretching direction, each strand-forming zone having, as considered in said stretching direction, a first part followed by a second part followed by a third part, said first and third parts being of less width than said second part, said respective widths being as measured in a direction at right angles to said stretching direction, and stretching said starting material in said stretching direction to stretch out and molecularly orientate said strand-forming zones to form molecularly-orientated strands, said strand-forming zones yielding initially at said first and third parts and said second parts being subsequently stretched out and molecularly orientated.

2. The method of claim 1, wherein said strand-forming zones are substantially symmetrical about an axis parallel to said stretching direction.

3. The method of claim 1, wherein said second part is in the middle of said strand-forming zones, as considered in said stretching direction.

4. The method of claim 1, wherein said first and third parts having substantially equal widths.

5. The method of claim 1, wherein said strand-forming zones are substantially symmetrical about an axis at right angles to said stretching direction.

6. The method of claim 1, wherein the ratio of the width of said second part to the width of said first and third parts is not less than 1.016:1.

7. The method of claim 1, wherein the ratio of the width of said second part to the width of said first and third parts is not greater than 1.2:1.

8. The method of claim 1, wherein said starting material is stretched in the first-mentioned said stretching direction and also in a second stretching direction at right angles to said first stretching direction, and said strand-forming zones are shaped such that said parts are defined as considered in said second stretching direction.

9. The method of claim 1, wherein said starting material is stretched in the first-mentioned said stretching direction and also in a second stretching direction at right angles to said first stretching direction, and said strand-forming zones are shaped such that said parts are defined as considered both in said first direction and in said second direction.

10. A molecularly-orientated plastics material mesh structure which has been formed by stretching an integral starting material having a pattern of holes or depressions whose centers are on a notional square or rectangular grid, which mesh structure comprises strands which have been molecularly orientated from end to end, and extend substantially parallel to a direction in which said starting material has been stretched to form said structure, each of which strands comprise first, second, third, fourth, fifth, sixth and seventh portions considered in order from one end of said strand to the other end; in said first and seventh portions, the middle of said strand having moved during stretching further away from the respective end of the strand than the edges of said strand; in said second, fourth and sixth portions, the middle of said strand having moved during stretching the same distance from the ends of said strand as the edges of said strand; and in said third and fifth portions, the middle of said strand having moved during stretching less from the respective end of said strand than the edges of said strand, and each said strand being of substantially the same width between said second and sixth portions.

11. A molecularly-orientated plastics material mesh structure which has been formed by stretching an integral starting material having a pattern of holes or depressions whose centers are on a notional square or rectangular grid, which mesh structure comprises strands which have been molecularly-orientated from end to end and extend substantially parallel to a direction in which said starting material has been stretched to form said mesh structure, and which mesh structure, on shrinking back to the starting material, forms a material which has a pattern of holes or depressions defining zones which formed the strands, each of which zones have, as considered in at least one shrink-back direction, a first part followed by a second part followed by a third part, said first and third parts being of less width than said second part, the respective widths being as measured in a direction at right angles to said at least one shrink-back direction, and wherein respective said holes or depressions have peripheries defined by curves or straight lines with smooth transitions from one curve or straight line to another.

* * * * *